United States Patent [19]

Kawamura et al.

[11] Patent Number: 4,591,903

[45] Date of Patent: May 27, 1986

[54] RECORDING APPARATUS

[75] Inventors: Naoto Kawamura, Inagi; Nobuo Kitajima, Toride, both of Japan

[73] Assignee: Canon Kabushiki Kaisha, Tokyo, Japan

[21] Appl. No.: 445,063

[22] Filed: Nov. 29, 1982

[30] Foreign Application Priority Data

Dec. 1, 1981 [JP] Japan ................................. 56-191747

[51] Int. Cl.⁴ .............................................. H04N 1/46
[52] U.S. Cl. ......................................... 358/75; 358/78
[58] Field of Search ................... 358/75, 78, 280, 285, 358/296, 300

[56] References Cited

U.S. PATENT DOCUMENTS

| | | | |
|---|---|---|---|
| 3,975,748 | 8/1976 | Green | 358/78 |
| 4,058,828 | 11/1977 | Ladd | 358/78 |
| 4,149,183 | 4/1979 | Pellar | 358/75 |
| 4,247,872 | 1/1981 | Wada | 358/280 |

Primary Examiner—Michael A. Masinick
Attorney, Agent, or Firm—Fitzpatrick, Cella, Harper & Scinto

[57] ABSTRACT

There is disclosed a laser beam printer for high-speed printing, in which an image is formed by superposing plural images formed on plural image members by means of plural lasers controlled by a common deflector.

21 Claims, 8 Drawing Figures

RECORDING APPARATUS

BACKGROUND OF THE INVENTION

1. Field of the Invention

The present invention relates to a recording apparatus for image formation on plural recording members with laser beams.

2. Description of the Prior Art

In conventional electrophotographic recording apparatus such as laser beam printers, image formation is achieved by scanning an electrophotographic photosensitive member constituting a recording member with a laser beam which is modulated with image signal and is deflected by a rotary prism or a mirror (hereinafter collectively called scanner). Such photosensitive member in the conventional apparatus is usually drum-shaped.

In order to obtain a color printer with the above-mentioned process, it becomes necessary to superpose plural images of different colors on a recording sheet, according to one of the following principal arrangements.

In one arrangement, a latent image formed by scanning the photosensitive drum with the image signal of a first color is rendered visible with developer, and the obtained image is transferred onto a recording sheet. Thereafter the photosensitive drum is cleaned, and a latent image is formed on the same drum according to the image signal of a second color and is processed in the same manner, but with developer of a second color. Thereafter the same process is repeated for the image signals of a third color and a fourth color. In this manner an image is obtained by superposing plural developed images on the same recording sheet.

In another arrangement, there are provided plural photosensitive drums of a number corresponding to the number of image signals. Latent images are formed on said drums respectively corresponding to the image signals of different colors, then developed respectively with developers of different colors and transferred in succession onto the recording sheet. In such arrangement there are usually provided a laser, a scanner and a photosensitive drum for each image signal, so that plural image signals to be superposed require a corresponding number of lasers, scanners and photosensitive drums.

The first-mentioned arrangement is associated with a drawback of a very long printing time required for a printout because the electrophotographic process consisting of the steps of charging, exposure, development, image transfer and cleaning has to be carried out at first for the image signal of the first color, then to be repeated for the images signals of the second, third and fourth colors. Though being featured by a shorter printing time, the second-mentioned arrangement is again associated with a drawback of requiring a larger and more expensive apparatus, since the lasers, scanners and drums are required in a number corresponding to the number of color image signals.

Also the printing time of a laser beam printer can be shortened by increasing the revolving speed of the scanner. In the conventional laser beam printers, however, the revolving speed of the scanner is already in a range as high as 2,000 to 20,000 rpm. Besides such scanner is provided with a prism or a mirror of polygonal shape, usually octagonal shape, of which face angles have to be extremely precise, generally within a tolerance of several seconds, since even a small error in the deflection angle leads to a significant positional error on the photosensitive drum because of a relatively long optical path of the laser beam. In addition such prism or mirror has to be free of vibration as far as possible at the high-speed rotation. For such stable high-speed rotation of the polygonal mirror there is required a large motor, and the manufacture of the scanner with highly precise mirror face angles requires the use of precision working with a limited production yield. For these reasons such scanner has inevitably been very expensive.

Consequently an apparatus employing plural units of such scanners has been inevitably large and expensive.

SUMMARY OF THE INVENTION

An object of the present invention is to provide an inexpensive recording apparatus not associated with the above-mentioned drawbacks and capable of high-speed printing.

Another object of the present invention is to provide a recording apparatus for forming an image by superposing plural images formed on plural recording member by means of plural laser beams, wherein a deflecting device is commonly used for scanning with plural laser beams.

Still another object of the present invention is to provide a recording apparatus for image formation by scanning plural recording members with plural laser beams, wherein the order of signal readouts for plural laser beams are mutually inverse.

The foregoing and still other objects of the present invention will become fully apparent from the following description.

DETAILED DESCRIPTION OF THE PREFERRED EMBODIMENTS

Now the present invention will be clarified in detail by the following description of preferred embodiments thereof to be read in conjunction with the attached drawings.

Figure 1:
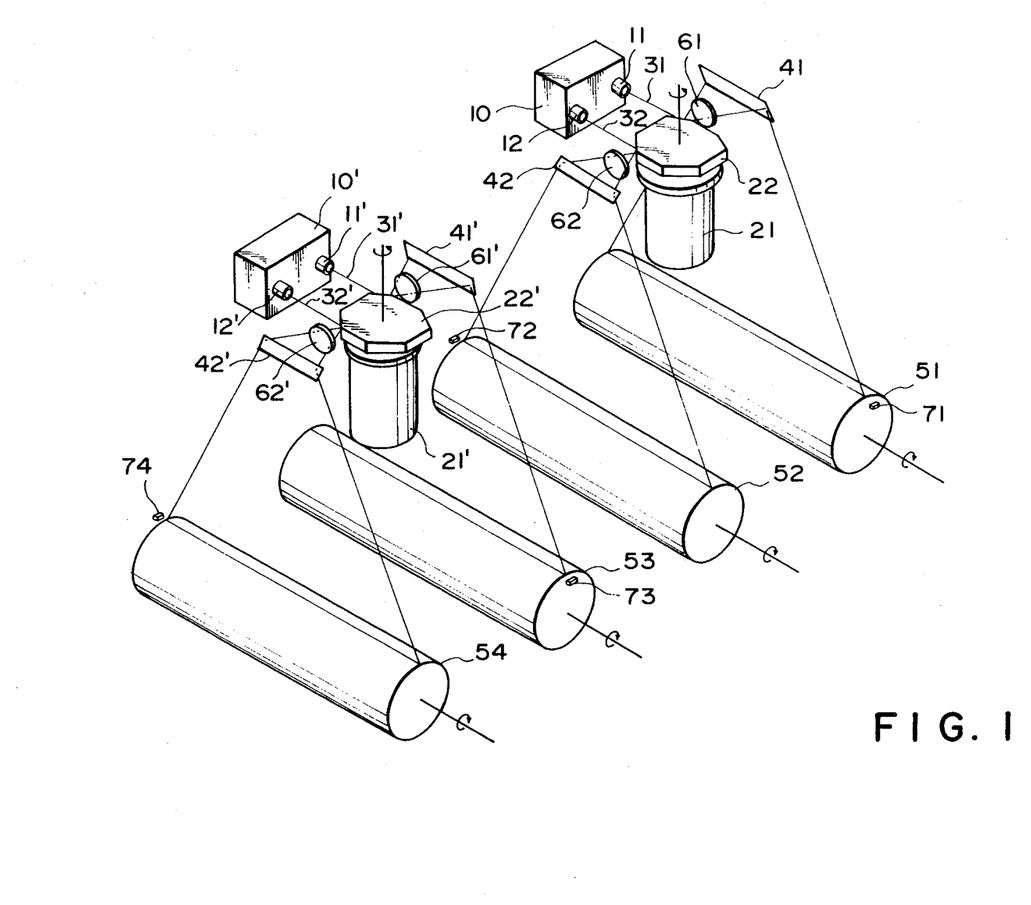
FIG. 1 is a perspective view of a first embodiment of the present invention.

FIG. 1 shows a first embodiment of the present invention, wherein illustrated are a laser unit 10 including a laser element and a driving circuit therefor, and a collimeter lens 11 for converting a laser beam from said laser unit into a parallel beam. A laser beam 31, modulated according to an image signal and rendered parallel by said collimeter lens 11, is deflected by a rotary polygonal mirror 22 rotated by a high-speed motor 21. The laser beam thus deflected is reflected by a mirror 41 toward a photosensitive drum 51, around which there are provided charging units, a developing unit, a transfer unit, a cleaning unit etc. necessary for an electrophotographic process and already known to those who are skilled in the art. For the purpose of simplicity these units are omitted in the drawing. The photosensitive drum 51 is rotated in a direction indicated by an arrow, and an unrepresented recording sheet advances in a direction from the drum 51 to another photosensitive drum 54. There are provided beam detectors 71-74 for releasing signals in order to align the starting positions of the main scannings.

An $f\theta$ lens 61 compensates the variation of focal point resulting from the difference in the optical path length of the laser beam between the central portion and the end portions of the photosensitive drum 51, thus enabling to obtain optimum focusing at any position along the longitudinal direction of said drum 51.

Also in an optical system associated with a second photosensitive drum 52, a laser beam emitted from a second laser element provided in the laser unit 10 is converted into a parallel beam 32 by a collimating lens 12, then deflected by the aforementioned rotary polygonal mirror 22, and guided through an $f\theta$ lens 62 and a mirror 42 to said photosensitive drum 52.

Said collimating lenses 11, 12 are so mutually distanced that the laser beams 31, 32 respectively fall on different faces of the rotary polygonal mirror 22. In case of an octagonal mirror as shown in FIG. 1, said beams are usually so positioned as to respectively fall on faces mutually spaced by another face, while in case of a tetragonal mirror, said beams are usually so positioned as to fall on mutually adjacent faces.

However the present invention is not limited to such case but includes other arrangements in which the laser beams fall respectively on different faces.

For photosensitive drums 53, 54 there are also provided optical systems similar to those for the photosensitive drums 51 and 52. The former ones, being identical with the latter ones, are indicated by reference numbers with primes and will be omitted from the explanation.

FIG. 1 shows an arrangement with four photosensitive drums 51, 52, 53, 54 for example respectively for cyan, magenta, yellow and black, and four corresponding lasers are driven through driving circuits by four color image signals.

Also as can be seen from FIG. 1, the photosensitive drums 51 and 52, or 53 and 54 are respectively scanned in opposite directions, so that the color image signals for the photosensitive drums 52 and 54 are supplied to the corresponding laser driving circuits respectively through electric memories of a capacity of one to several scanning lines in such a manner that the color image signal for each scanning line is inverted in sequence.

Figure 2:
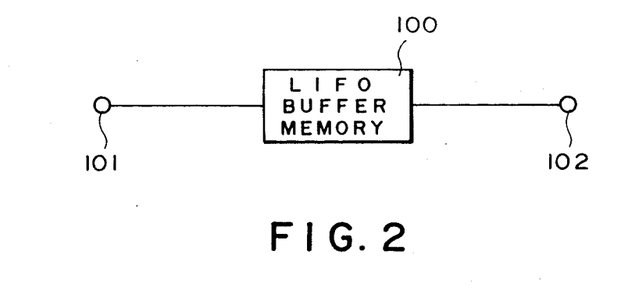
FIG. 2 is a block diagram of a LIFO memory.

FIG. 2 is a block diagram showing the structure of said memory for inverting the sequence of the image signal, wherein serial data of a scanning line in normal order are stored through an input line 101 in a LIFO (last-in-first-out) memory 100, while the signal readout is carried out in the inverted order, i.e. in the last-in-first-out manner, thus providing image data of a scanning line in the inverted order on an output line 102.

Figure 3:
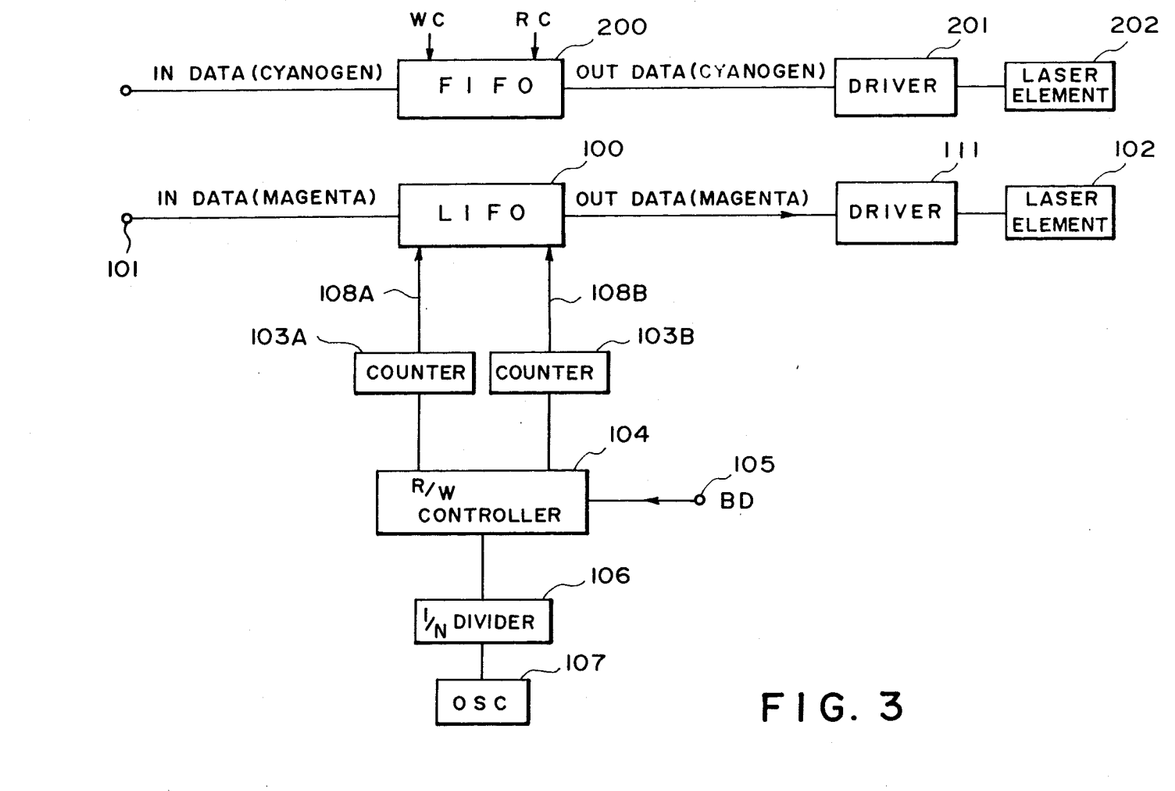
FIG. 3 is a block diagram of a circuit for memory readout control.
Figure 4:
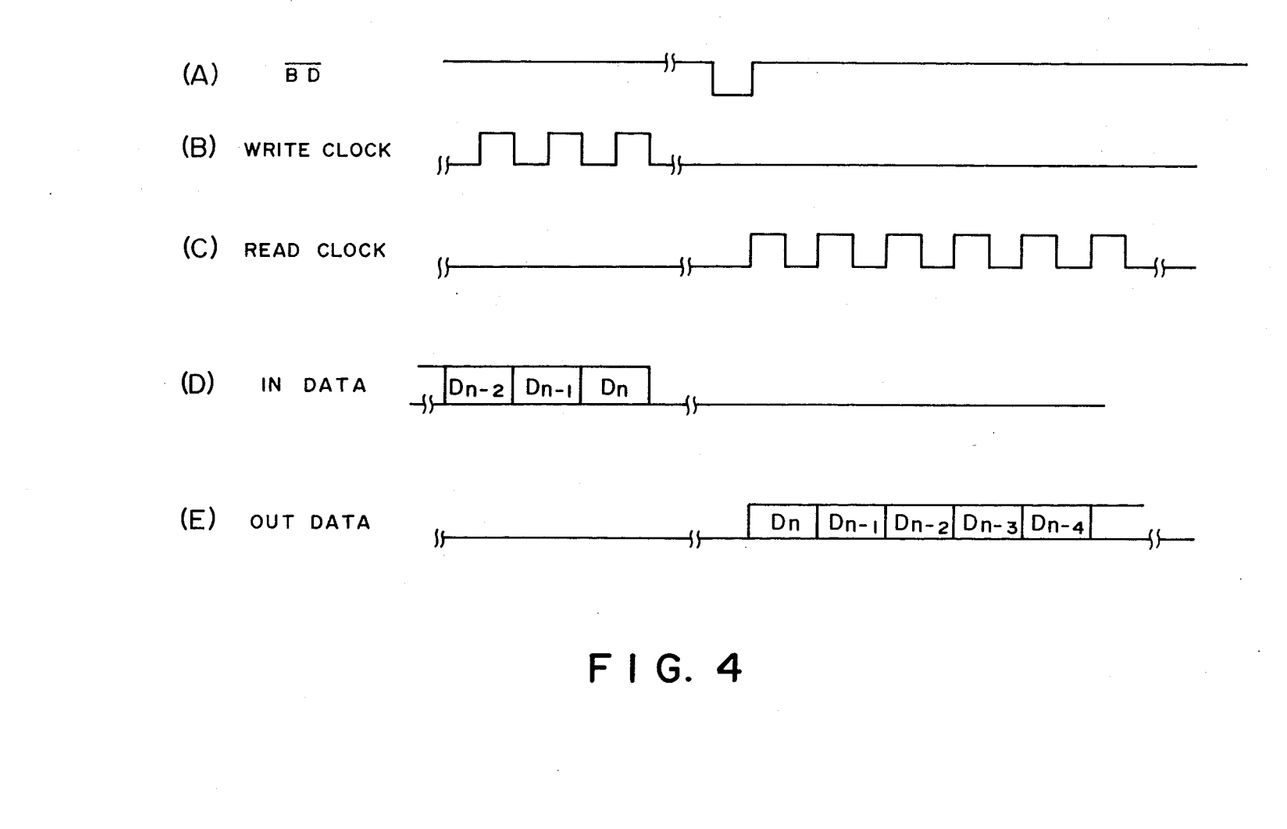
FIG. 4 is a timing chart of various signals in the circuit shown in FIG. 3.

Now reference is made to FIGS. 3 and 4 for explaining more detailedly the process of inverting the order of serial data of one scanning line by means of said LIFO memory.

It is assumed that said LIFO memory has a memory capacity of storing magenta image data of one scanning line. A basic frequency generated by a crystal oscillator 107 is divided into 1/N by a frequency divider 106 to obtain determined pixel clock pulses, which are further divided by a read/write controller 104 and supplied to a read counter 103A and a write counter 103B.

The division of said pixel clock pulses is conducted in such a manner that read clock pulses shown in FIG. 4(C) are generated at first in response to a horizontal synchronization signal BD, which is generated, in order to align the start position of the main scanning on the photosensitive drum 52, by the beam detector 72 when the laser beam passes a position slightly outside said start position. Subsequently there are generated write clock pulses, as shown in FIG. 4(B) during the image blanking period.

The clock pulses thus divided are transmitted through the counter 103A or 103B to the LIFO memory but said transmission is terminated when said counter reaches a determined count, thereby preventing the overflow of the LIFO memory. In this manner the data of the normal order are stored in the LIFO memory 100 through the input line 101 as shown in FIG. 4(D) in synchronization with the write clock pulses 108A. Said write clock pulses are terminated after a determined number corresponding to the amount of data in a scanning line, thereby terminating the data entry. The data thus stored in the LIFO memory 100 are then read in the inverted order in synchronization with the read clock pulses (FIG. 4(C)) triggered by the horizontal synchronization signal BD (FIG. 4(A)). Said read clock pulses are also terminated after a determined number.

The inversion of the order of image data is achieved in the above-mentioned manner. The image data thus inverted are supplied to a laser driving circuit 111 corresponding to the photosensitive drum 52, thus forming a magenta image thereon by means of the laser element 102 in the laser unit.

Figure 5:
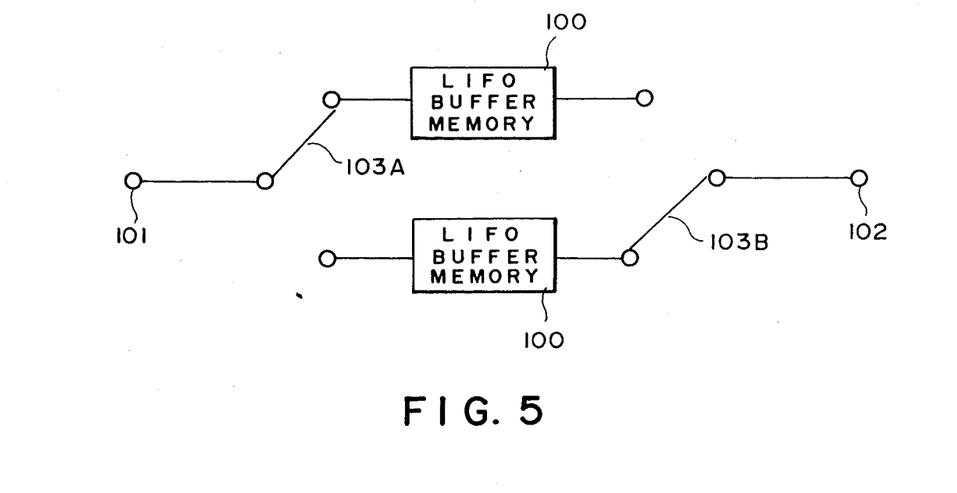
FIG. 5 is a block diagram showing a circuit with double buffers.

A memory 200 for the cyan image nor requiring such inversion is composed of a FIFO (first-in-first-out) memory. Also said memory 200 receives the write clock pulses WC and read clock pulses RC in the same manner to store the cyan image data in synchronization with the write clock pulses WC during the image blanking period and to release said image data in the same order in synchronization with the read clock pulses RC, thereby driving a laser driving circuit 201 to form a cyan image on the photosensitive drum 51 by means of a laser element 202 in said laser unit. There is also provided a similar circuit for the photosensitive drums 53, 54. As mentioned above, the storage of the image signal into the memory 100 is preferably conducted during the image blanking period, in which no image recording is effected. In case such non-recording period is too short for data transfer to the memory, there may be employed a double buffer memory system having two or more memories 100 as shown in FIG. 5, in which the data storage is conducted in one of said memories while the data readout is conducted in another, by means of seesawing switches 109A, 109B for connecting the input and output lines.

Said laser driving circuits may be provided with shift registers for compensating the deviations amount four colors.

In the following shown are the dimensions, in millimeters, of the embodiment shown in FIG. 1:
  diameter of photosensitive drums 51-54: 60 mm$\phi$
  length of photosensitive drums 51-54: 240 mm
  distance between adjacent drums: 140 mm distance between adjacent beams 11 and 12: 40 mm
length of a face of polygonal mirror 22: 24 mm
width of a face of polygonal mirror 22: 8 mm
distance between drum 51 and mirror 41: 190 mm
distance between mirror 41 and fθ lens 61: 30 mm
focal length of fθ lens 61: 220 mm
wherein the shaft of the polygonal mirror 22 is positioned on the extention of a line equally dividing the distance between the photosensitive drums 51 and 52.

Figure 6:
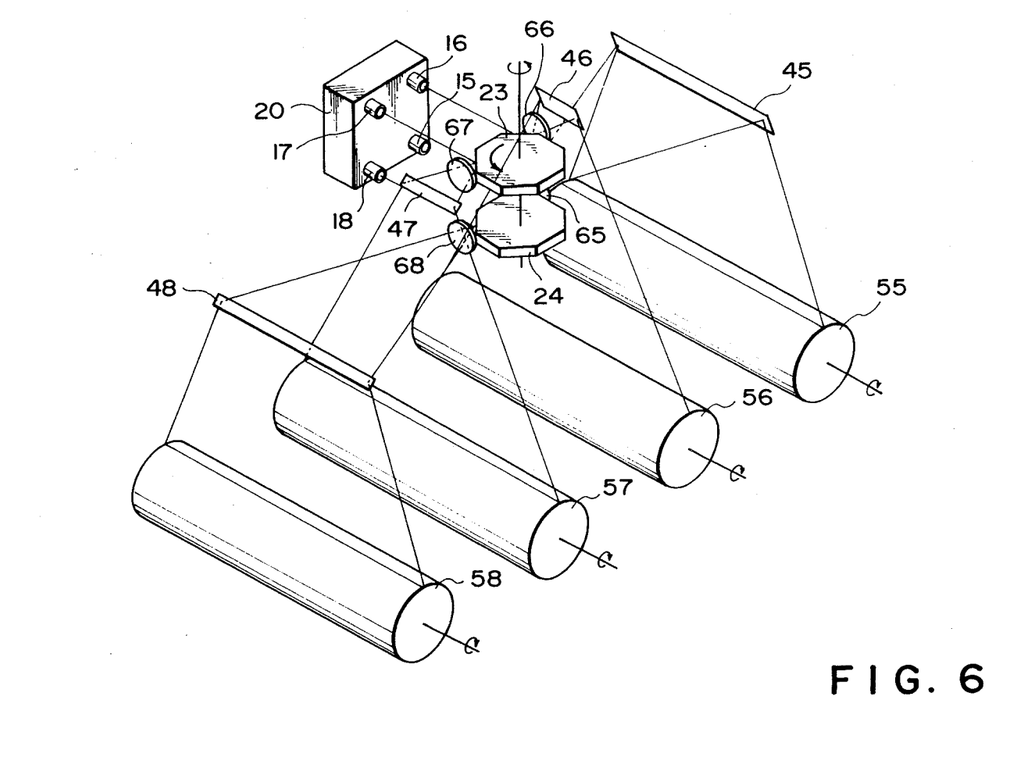
FIG. 6 is a perspective view of a second embodiment of the present invention.

FIG. 6 shows a second embodiment of the present invention in a perspective view, wherein two scanners, different from the foregoing embodiment shown in FIG. 1, are integrated and can be driven by an unrepresented motor.

Collimated laser beams emerging from a laser unit 20 composed or unrepresented semiconductor laser elements and collimating lenses 15, 16, 17, 18 are deflected by rotary polygonal mirrors 23, 24 of a two-storied structure toward fθ lenses 65, 66, 67, 68, and further guided respectively to photosensitive drums 55, 56, 57, 58 through mirrors 45, 46, 47, 48. In this manner four lasers are integrated in the laser unit 20, and the polygonal mirrors 23, 24 are positioned coaxially and rotated at a high speed by a single motor. Since the rotary center of the polygonal mirrors 23, 24 is positioned at the center between the photosensitive drums 56 and 57, the optical path length to the drums 55 and 58 is different from that to the drums 56 and 57, so that the local length of the lens 65 is equal to that of the lens 68 but is longer than that of the lens 66 which is equal to that of the lens 67, thus giving rise to a different scanning speed on the drums 55, 58 from that on the drums 56, 57. In order to compensate said difference, the image signals supplied to the laser driving circuits are subjected to electric processing shown in FIG. 7.

Figure 7:
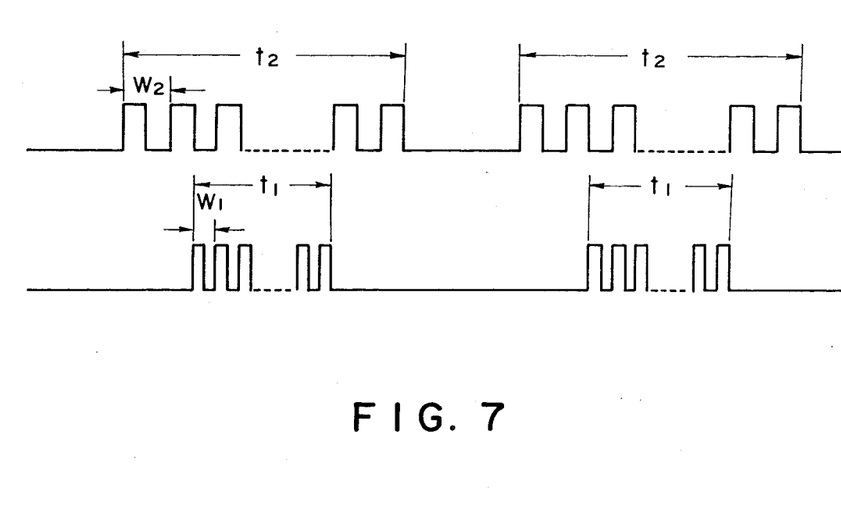
FIG. 7 is a timing chart showing a modulation method in a reflecting system with different optical path lengths.

Now reference is made to FIG. 7 for explaining the method of modulation for such optical systems having different optical path lengths.

It is assumed that the fθ lenses 65, 68 have a focal length f1 while the lenses 66, 67 have a focal length f2, and that the image signal time of a scanning line is equal to t1 or t2 respective on the drums 55, 58 or 56, 57. In such case the input signals to the laser driving circuits are so corrected as to maintain relations $t1/t2 = f2/f1$ and $w1/w2 = f2/f1$, wherein w1 is the clock pulse frequency for the photosensitive drums 55, 58 while w2 is the clock pulse frequency for the photosensitive drums 56, 57.

Figure 8:
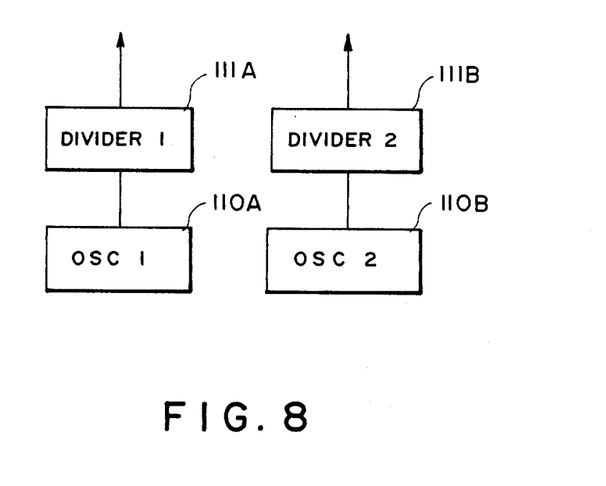
FIG. 8 is a block diagram for achieving the modulation method shown in FIG. 7.

FIG. 8 shows a circuit for generating said clock pulses of two different frequencies, wherein oscillators 110A, 110B are composed for example of crystal oscillators satisfying the above-mentioned relation $w1/w2 = f2/f1$. The output signals of said oscillators are respectively divided into 1/N by frequency dividers 111A, 111B to obtain pixel clock pulses of the frequencies $w1'$, $w2'$ which still satisfy the relation $w1'/w2' = f2/f1$. The output signal from said oscillator 110A and frequency divider 111A is utilized as the synchronization signal for the photosensitive drums 55, 58 while that from said oscillator 110B and frequency divider 111B is utilized as the synchronization signal for the drums 56, 57 in order to control the data write-in into or the data read-out from the memories. The memories for the drums 55, 56 are composed of FIFO memories while those for the drums 57, 58 are composed of LIFO memories.

The above-described compensation provided a constant dot density on each photosensitive drum, even when the beam scanning speed on the drum varies according to a variation in the optical path length.

In the following shown are the dimensions, in millimeters, of said second embodiment:
distance between collimating lenses 16, 15: 50 mm
distance between rotary mirrors 24, 23: 50 mm
focal length of fθ lenses 65, 68: 300 mm
focal length of fθ lenses 66, 67: 220 mm
distance between drum 55 and mirror 45: 140 mm
distance between drum 56 and mirror 46: 190 mm
distance between mirror 45 and fθ lens 65: 160 mm
distance between mirror 46 and fθ lens 66: 30 mm,
wherein other parameters are same as those in the foregoing first embodiment.

Although the fθ lenses explained above have two different focal lengths, it is also possible to use a common focal length for all the lenses with a certain modification in the spatial arrangement. In such modification two rotary mirrors are mutually spaced by a distance approximately equal to the distance between the drums, so that said rotary polygonal mirrors are preferably mounted on both ends of a shaft extending on both sides of a motor, and the aforementioned signal processing can be dispensed with in such modification.

Furthermore it is possible to employ a single polygonal mirror instead of two polygonal mirrors used in the foregoing embodiment.

Although the present invention has been explained by a few embodiments thereof, the present invention is by no means limited to an arrangement utilizing four photosensitive drums but includes any other arrangement employing two or more photosensitive drums.

Also the lasers corresponding to the image signals may be constructed with a hybrid structure or may be composed of a semiconductor laser array.

Furthermore it is possible to guide the laser beam from a laser to plural drums for example through a beam splitter by time sequentially separating different image signals, or to modulate plural split beams with different image signals before guiding to plural drums.

Furthermore the present invention is not limited a color printer but is also applicable to a monochromatic printer in which plural image signals are superposed.

As explained in the foregoing, the present invention, allows utilization of a scanner for deflecting plural laser beams, enables the laser beam printer to be compact and allows provision of an inexpensive laser beam printer capable of high-speed printing.

We claim:

1. A recording apparatus comprising:
   plural recording members;
   laser beam generating means for generating plural laser beams for image formation on said plural recording members in response to image signals, wherein individual images formed on said plural recording members are superposed to obtain a combined color image; and
   deflecting means for simultaneously deflecting said plural laser beams toward said plural recording members, wherein said deflecting means is commonly used for plural laser beams.

2. A recording apparatus according to claim 1, wherein said deflecting means is used for two laser beams.

3. A recording apparatus according to claim 2, wherein said deflecting means causes said two laser beams to perform scanning motions in mutually opposite directions.

4. A recording apparatus according to claim 3, further comprising process means for inverting the time sequential order of the image signal for one of said laser beams performing a scanning motion in a direction opposite to that of its original scanning direction by said deflecting means on a recording member.

5. A recording apparatus according to claim 1, wherein said deflecting means is so positioned as to obtain mutually equal optical path lengths for two laser beams deflected by said deflecting means.

6. A recording apparatus according to claim 1, wherein said deflecting means is so positioned as to obtain mutually different optical path lengths for two laser beams deflected by said deflecting means.

7. A recording apparatus according to claim 6, further comprising imaging lenses to uniformly focus said laser beams onto the surfaces of the recording members, wherein said lenses have focal lengths corresponding to the optical path lengths thereof.

8. A recording apparatus according to claim 7, further comprising image signal processing means for maintaining a constant product of the unit image signal time of the laser beam performing the scanning motion by said deflecting means on the surface of said recording member and of the focal length of said imaging lens for uniform focusing on said surface.

9. A recording apparatus comprising:
first laser beam generating means driven in response to first image information;
second laser beam generating means driven in response to second image information;
a first recording member for forming a first image by scanning with a first laser beam emitted by said first laser beam generating means;
a second recording member for forming a second image by scanning with a second laser beam emitted by said second laser beam generating means; wherein the scanning direction of said first laser beam is opposite to that of said second laser beam;
first image information output means for supplying said first laser beam generating means with said first image information in a same order as it is received; and
second image information output means for supplying said second laser beam generating means with said second image information in an inverted order.

10. A recording apparatus according to claim 9, wherein said first image information output means comprises a first-in-first-out buffer memory.

11. A recording apparatus according to claim 9, wherein said second image information output means comprises a last-in-first-out buffer memory.

12. A recording apparatus according to claim 9, further comprising deflecting means for deflecting said first laser beam and said second laser beam respectively to said first recording member and said second recording member.

13. A recording apparatus according to claim 12, wherein said deflecting means is used for said first and second laser beams.

14. A recording apparatus comprising:
plural recording members;
laser beams generating means for generating plural laser beams for image formation on said plural recording members in response to image signals;
deflecting means for deflecting said plural laser beams toward said plural recording members, wherein said deflecting means is used for plural laser beams and is so positioned as to obtain mutually different optical path lengths for the plural laser beams deflected by said deflecting means; and
means for correcting said difference in optical path lengths.

15. A recording apparatus according to claim 14, wherein said correcting means comprises imaging lenses for uniformly focusing said laser beams on the surface of said recording members, and said imaging lenses are provided with focal lengths respectively corresponding to the optical path lengths.

16. A recording apparatus according to claim 15, wherein said correcting means comprises image signal processing means for maintaining a constant product of the unit image signal time of the laser beam performing the scanning motion by said deflecting means on the surface of said recording member and of the focal length of said imaging lens for uniform focusing on said surface.

17. A recording apparatus according to claim 14, further comprising plural coaxial deflecting means.

18. A recording apparatus comprising:
recording means having plural recording stations;
laser beam generating means for generating plural laser beams for image formation at said plural recording stations in response to image signals; and
deflecting means for simultaneously deflecting each one of said plural laser beams toward a different one of said plural recording stations.

19. An apparatus according to claim 18, wherein each of said plural recording stations has a movable recording member.

20. An apparatus according to claim 18, wherein the images formed on said plural recording stations are superposed to obtain an image.

21. An apparatus according to claim 19, wherein the images formed on said plural recording stations are superposed to obtain an image.

* * * * *